(12) United States Patent
Nakazawa

(10) Patent No.: US 8,472,091 B2
(45) Date of Patent: Jun. 25, 2013

(54) IMAGE SCANNER, IMAGE FORMING APPARATUS, AND SAMPLE HOLD CONTROL METHOD

(75) Inventor: Masamoto Nakazawa, Kawasaki (JP)

(73) Assignee: Ricoh Company, Limited, Tokyo (JP)

( * ) Notice: Subject to any disclaimer, the term of this patent is extended or adjusted under 35 U.S.C. 154(b) by 751 days.

(21) Appl. No.: 12/640,646

(22) Filed: Dec. 17, 2009

(65) Prior Publication Data

US 2010/0171998 A1 Jul. 8, 2010

(30) Foreign Application Priority Data

Jan. 7, 2009 (JP) ................................. 2009-001744

(51) Int. Cl.
*H04N 1/04* (2006.01)
(52) U.S. Cl.
USPC .......................................... 358/482; 358/474
(58) Field of Classification Search
USPC ................... 358/400, 443, 474, 482
See application file for complete search history.

(56) References Cited

U.S. PATENT DOCUMENTS

| 2007/0188638 A1 | 8/2007 | Nakazawa et al. |
| 2008/0252787 A1 | 10/2008 | Nakazawa et al. |
| 2010/0027061 A1 | 2/2010 | Nakazawa |

FOREIGN PATENT DOCUMENTS

| JP | 11-177783 | | 7/1999 |
| JP | 11177783 A | * | 7/1999 |

* cited by examiner

*Primary Examiner* — Thomas D Lee
(74) *Attorney, Agent, or Firm* — Oblon, Spivak, McClelland, Maier & Neustadt, L.L.P.

(57) ABSTRACT

A scanner includes: a photoelectric conversion element configured to photoelectrically convert light reflected from an original image to form an image signal; a timing generation circuit configured to generate a drive signal for the photoelectric conversion element; a drive circuit configured to drive the photoelectric conversion element; a signal processing circuit configured to subject a sample hold signal fed in through the drive circuit and the image signal to an A/D conversion; and a control circuit configured to turn on the sample hold signal when the scanner transitions to an "ON" state from an "OFF" state and turn off the sample hold signal when the scanner transitions to the "OFF" state from the "ON" state. The control circuit turns on and off the sample hold signal, based on each of input fed to the drive circuit and the signal processing circuit.

10 Claims, 8 Drawing Sheets

IMAGE SCANNER, IMAGE FORMING APPARATUS, AND SAMPLE HOLD CONTROL METHOD

BACKGROUND OF THE INVENTION

1. Field of the Invention

The present invention relates to an image scanner optically reading original images, and more particularly to an image scanner equipped with an AFE (Analog-Front-End) capable of driving at high speed. In addition, the present invention relates to an image forming apparatus such as digital copiers, facsimiles and digital multifunctional printers equipped with the image scanner. Further, the present invention relates to a sample hold control method used in the image scanner and the image forming apparatus.

2. Discussion of the Background

Accompanied with demands for images having higher quality at higher speed from image forming apparatus such as digital copiers, an image scanner installed in image forming apparatus is required to read images at higher pixel and higher speed. Therefore, a CCD (Charged Coupled Device) and an AFE (Analog-Front-End) in a scanner are required to drive at higher speed. The CCD photoelectrically converts light reflected from the original image, and the converted image signal is fed into the AFE to be subjected to a sample hold and an A/D conversion. When the CCD and the AFE are driven at high speed, it is necessary to ensure timing of the image signal produced from the CCD and a sample hold signal (hereinafter referred to as "SHD") controlling the sample hold at the AFE.

As a method of ensuring timing of the image signal from the CCD and the sample hold signal, an invention disclosed in Japanese published unexamined application No. 11-177783 is known. The present invention has a CCD an original image is projected on while reduced and three sample hold circuits, which are driven on a same substrate. A CCD drive clock and a sample hold signal are fed through a same driver because an image signal from the CCD depends on a CCD drive signal. Therefore, the CCD drive signal and SHD, further the image signal from the CCD and a timing skew are reduced to ensure timing even when the CCD and the AFE are driven at high speed.

However, the CCD is driven at 5 V while the AFE at 3.3 v, and therefore an output of the driver cannot directly be used as the SHD and an amplitude is reduced with a partial pressure. Then, the AFE has an I/F of a different electric source regardless of the amplitude. Namely, since the SHD is independently fed from the AFE, when a driver electric source (5 V) and an AFE electric source (3.3 V) rise up in this order, an excess voltage is applied to the AFE, resulting in breakdown and deterioration of devices, and even destruction thereof in the worst case. This can be avoided with a diode inserted between the SHD and the AFE electric source, but a diode varies a reverse bias capacity so much that the CCD and the AFE are difficult to drive at high speed.

FIG. 10 is a block diagram illustrating a configuration of periphery of a CCD 4, a timing signal generator (TG) 3, a CCD driver (DRV) 6 and an AFE 5 of a conventional scanner 111. TG3 generates a CCD drive signal (CCD_CLK) and an AFE drive signal (SHD, MCLK). The CCD_CLK and SHD signals are fed to CCD 4 and AFE 5, respectively through the DRV 6. The MCLK needs to ensure a timing with the SHD fed from the DRV, however, it is not fed through the DRV 6 in FIG. 10 because the timing is easily ensured. Meanwhile, the CCD 4 produces an image signal (SIG), which is buffered by an output buffer (EF) 7 formed of an emitter follower and fed into the AFE 5 through an AC connection 8.

FIG. 11 illustrates a detail of a circuit configuration of periphery of the TG 3, CCD 4 and AFE 5 in FIG. 10. In FIG. 11, the voltage of the SHD of the AFE 5 is divided so as to become from DRV_VCC 5V to AFE_VCC 3.3 V (In FIG. 4, SIG is omitted).

FIG. 12 illustrates a relationships among the SHD of the AFE 5, the DRV_VCC 5V and the AFE_VCC 3.3 V in FIG. 11. As FIG. 12 shows, in a sequence where the DRV_VCC and the AFE_VCC rise up in this order when the apparatus is switched on and the AFE_VCC and the DRV_VCC shut down when the apparatus is switched off, the following status is present:

AFE_VCC: OFF
DRV_VCC: ON

Therefore, a period of a time lag between the rise up and the shut down (Tlag_on and Tlag_off) is a period when SHD applies an excess voltage to the AFE 5, an input rating of the AFE 5 such as VCC+0.5V cannot be satisfied. In the present invention, power-on and power-off mean power-on and power-off of a scanner or an image forming apparatus.

Because of these reasons, a need exists for a scanner avoiding an excess voltage to an AFE and having no limit to a sequence of power supply.

SUMMARY OF THE INVENTION

Accordingly, an object of the present invention is to provide a scanner avoiding an excess voltage to an AFE and having no limit to a sequence of power supply.

Another object of the present invention is to provide an image forming apparatus using the scanner.

A further object of the present invention is to provide a sample hold control method used in the scanner and the image forming apparatus.

These objects and other objects of the present invention, either individually or collectively, have been satisfied by the discovery of a scanner, comprising:

a photoelectric conversion element configured to photoelectrically convert light reflected from an original image to form a image signal;

a timing generation circuit configured to generate a drive signal for the photoelectric conversion element;

a drive circuit configured to drive the photoelectric conversion element;

a signal processing circuit configured to subject a sample hold signal fed in through the drive circuit and the image signal to an A/D conversion, wherein the scanner further comprises a control circuit configured to turn on and off the sample hold signal when the scanner is powered on and off, respectively.

These and other objects, features and advantages of the present invention will become apparent upon consideration of the following description of the preferred embodiments of the present invention taken in conjunction with the accompanying drawings.

According one feature of the present invention, a scanner includes: a photoelectric conversion element configured to photoelectrically convert light reflected from an original image to form an image signal; a timing generation circuit configured to generate a drive signal for the photoelectric conversion element; a drive circuit configured to drive the photoelectric conversion element; a signal processing circuit configured to subject a sample hold signal fed in through the drive circuit and the image signal to an A/D conversion; and a control circuit configured to turn on the sample hold signal when the scanner transitions to an "ON" state from an "OFF" state and turn off the sample hold signal when the scanner transitions to the "OFF" state from the "ON" state. The control circuit turns on and off the sample hold signal, based on each of input fed to the drive circuit and the signal processing circuit.

According to another feature of the present invention, the control circuit is connected in a position that is adjacent to the drive circuit.

According to yet another feature of the present invention, the control circuit turns on and off the sample hold signal with an output control terminal of the drive circuit.

According to one feature of the present invention, a scanner includes: a photoelectric conversion element configured to photoelectrically convert light reflected from an original image to form an image signal; a timing generation circuit configured to generate a drive signal for the photoelectric conversion element; a drive circuit configured to drive the photoelectric conversion element; a signal processing circuit configured to subject a sample hold signal fed in through the drive circuit and the image signal to an A/D conversion; and a control circuit configured to turn on the sample hold signal when the scanner transitions to an "ON" state from an "OFF" state and turn off the sample hold signal when the scanner transitions to the "OFF" state from the "ON" state. A control signal controlling on and off of the sample hold signal is transmitted to an output control terminal of the drive circuit and is based on the power of the signal processing circuit.

According to another feature of the present invention, a random drive signal of the photoelectric conversion element is a signal from two or more parallel-connected drive gates, the signal being based on a third signal controlled by on and off of the sample hold signal and a fourth signal not controlled thereby.

According to yet another feature of the present invention, the control circuit turns on the sample hold signal when the scanner transitions to the "ON" state, which is a full power state, from a low-power mode and turns off the sample hold signal when the scanner transitions to the low-power mode from the "ON" state.

According to still another feature of the present invention, an image forming apparatus includes the scanner and a printer including a printer engine.

According one feature of the present invention, a method of controlling a sample hold signal in a scanner includes: photoelectrically converting light reflected from an original image with a photoelectric conversion element to form an image signal; generating a drive signal for the photoelectric conversion element with a timing generation circuit; driving the photoelectric conversion element with a drive circuit; subjecting a sample hold signal fed in through the drive circuit and the image signal to an A/D conversion by a signal processing circuit; and turning on the sample hold signal when the scanner transitions to an "ON" state from an "OFF" state and turning off the sample hold signal when the scanner transitions to the "OFF" state from the "ON" state, based on power supplied to each of the drive circuit and signal processing circuit.

According one feature of the present invention, a method of controlling a sample hold signal in a scanner includes: photoelectrically converting light reflected from an original image with a photoelectric conversion element to form an image signal; generating a drive signal for the photoelectric conversion element with a timing generation circuit; driving the photoelectric conversion element with a drive circuit; and subjecting a sample hold signal fed in through the drive circuit and the image signal to an A/D conversion by a signal processing circuit. A control signal controlling on and off of the sample hold signal is transmitted to an output control terminal of the drive circuit and is based on the power of the signal processing circuit, and turning on and off the sample hold signal when the scanner is powered on, respectively, is based on power supplied to each of the drive circuit and signal processing circuit.

According another feature of the present invention, the method further includes turning on the sample hold signal when the scanner transitions to the "ON" state, which is a full power state, from a low-power mode and turning off the sample hold signal when the scanner transitions to the low-power mode from the "ON" state.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION OF PREFERRED EMBODIMENTS

The present invention provides a scanner avoiding an excess voltage to an AFE and having no limit to a sequence of power supply.

More particularly, the present invention relates to a scanner, comprising:

a photoelectric conversion element configured to photoelectrically convert light reflected from an original image to form a image signal;

a timing generation circuit configured to generate a drive signal for the photoelectric conversion element;

a drive circuit configured to drive the photoelectric conversion element;

a signal processing circuit configured to subject a sample hold signal fed in through the drive circuit and the image signal to an A/D conversion, wherein the scanner further comprises a control circuit configured to turn on and off the sample hold signal when the scanner is powered on and off, respectively.

In the following embodiments, the photoelectric conversion element corresponds to CCD 4, the timing generation circuit corresponds to a timing signal generator (TG) 3, The drive circuit corresponds to a CCD driver (DRV) 6, the sample hold signal corresponds to SHD, the image signal corresponds to SIG, the signal processing circuit corresponds to AFE 5, the scanner corresponds to scanner 111, the control circuit corresponds to SHD controller (SHD_CTL) 9, an output control terminal of the drive circuit corresponds to 6 ctl, and the image forming apparatus corresponds to 100, respectively.

Hereinafter, preferred embodiments of the present invention will be concretely described with referent to the drawings.

Embodiment 1

Figure 1:
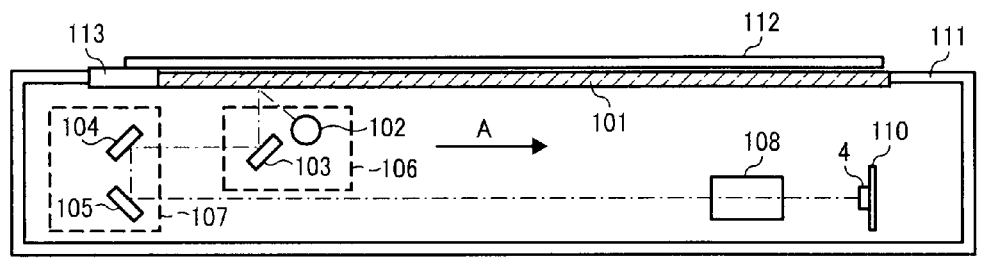
FIG. 1 is a schematic view illustrating the scanner in Embodiment 1 of the present invention.

FIG. 1 is a schematic view illustrating the scanner in Embodiment 1 of the present invention. The scanner 111 has a flat head and a contact glass 101 an original image is placed on the head. Below the contact glass 101, a first carriage 106 and a second carriage 107 are located such that the first carriage 106 travels at a double speed of that of the second carriage 107 in the direction of an arrow (sub-scanning direction). The first carriage 106 has a halogen lamp 102 as a light source and a first mirror 103, and the second carriage 107 has a second mirror 104 and a third mirror 105. Light emitted from the halogen lamp 102 to the original image is reflected thereby, and further reflected by the first mirror 103, the second mirror 104 and the third mirror 105 to enter an imaging lens 108. The imaging lens 108 collects light and images on an imaging surface of a CCD (linear image sensor) 4. An analog electric signal photoelectrically converted by the CCD 4 is converted into a digital electric signal by the sensor board 110, and fed to the following process. The first carriage 106 travels at a double speed of that of the second carriage 107 in the sub-scanning direction to maintain the light path length from the original image surface to the imaging surface of an image sensor 109, and the CCD 4 is loaded on the sensor board 110.

A pressure plate 112 is openably and closably located so as to cover the upper surface of the contact glass 101 such that light does not enter the CCD 4 from outside when an original image is placed on the contact glass 101. An ADF or ARDF may be located instead of the pressure plate 112 to automatically feed original images. A standard white board 113 is located on the pressure plate 112 at a side of home positions of the first carriage 106 and the second carriage 107 to adjust shading.

Figure 2:
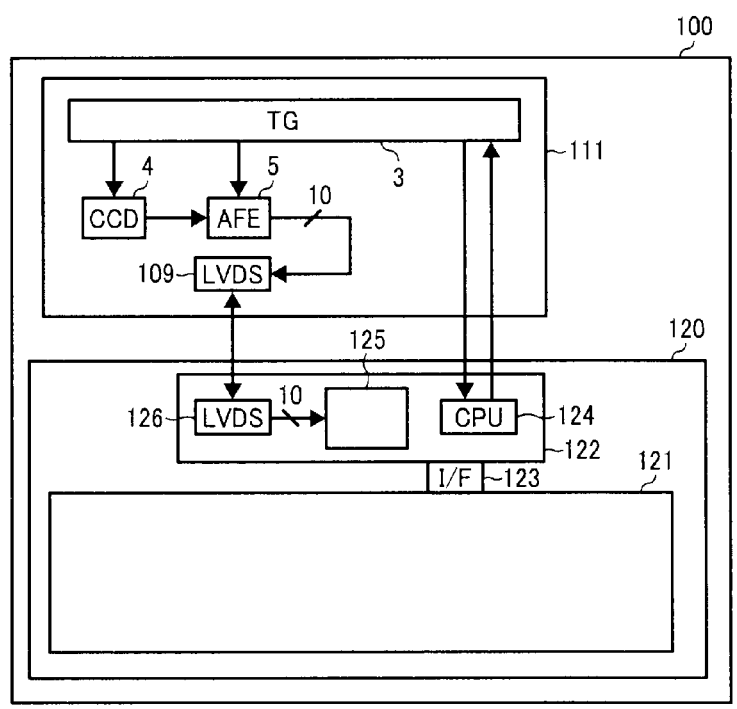
FIG. 2 is a schematic view illustrating an image forming apparatus using the scanner in FIG. 1.

FIG. 2 is a schematic view illustrating an image forming apparatus using the scanner in FIG. 1. An image forming apparatus 100 includes the scanner 111 and a printer 120. The scanner 111 includes a timing signal generator (TG) 3, CCD (image sensor) 4 and AFE 5, which is mentioned later. A 10 bit DOUT signal is fed to LVDS (Low Voltage Differential Signaling) 109 from the AFE 5. The control circuit of the scanner 111 is mentioned later.

The printer 120 has a printer engine 121 and a printer controller 122 controlling the printer engine 121, which are connected with each other through I/F 123. The controller 122 includes CPU 124, an image processor 125 and LVDS 126. The CPU 124 is inter-communicably connected with the TG3 and controls the printer engine 121 based on an image signal entered through the LVDS 126 to form an image on a recording paper. Since the printer engine 121 has various image forming processes and any printer engines can be used, the explanation thereof is omitted.

An image forming apparatus including the scanner 111 and the printer 120 is used in a digital complex machine (MFP-Multi Function Peripheral) including plural functions such as copiers, printers and facsimiles besides a single copier or a printer. These machines are attached to a network and can produce images based on instructions from a network terminal device.

The CPU 124 reads out a program stored in a ROM (not shown) and expands it to a RAM (not shown), executes the program while using the RAM as a work area and controls the printer engine 121 to perform a process needed to form images. The program is written in recording media such as FDs CDS and DVDs, and downloaded when the recording media are read or through a network to be used.

Figure 3:
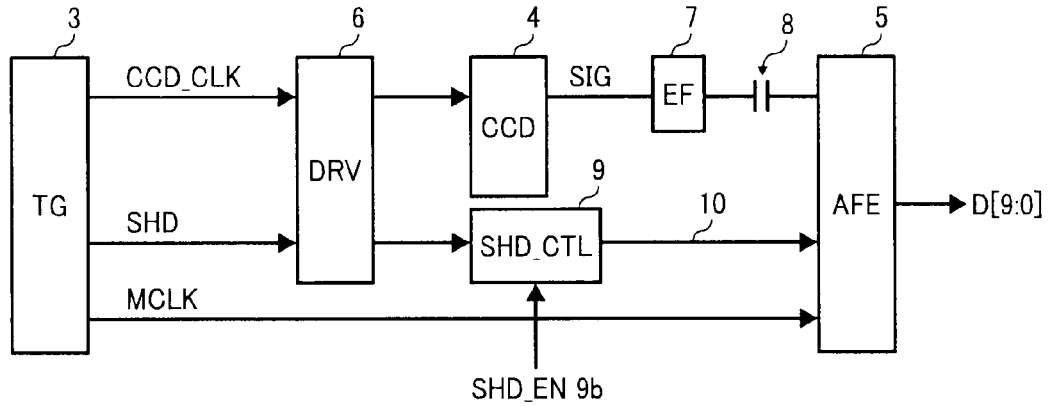
FIG. 3 is a block diagram showing a circuit configuration of periphery of a CCD of the scanner, a timing signal generation part (TG), a CCD driver (DRV) and an AFE in Embodiment 1.
Figure 10:
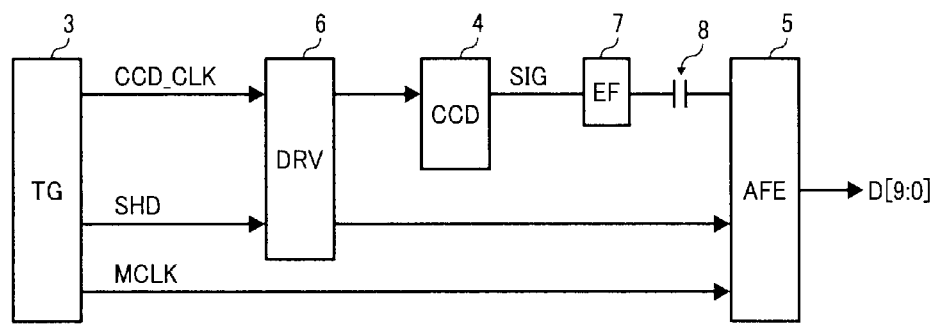
FIG. 10 is a block diagram showing a circuit configuration of periphery of a CCD of the scanner, a timing signal generation part (TG), a CCD driver (DRV) and an AFE in a conventional embodiment.

FIG. 3 is a block diagram showing a circuit configuration of periphery of the CCD 4, the timing signal generator (TG) 3, the CCD driver (DRV) 6 and the AFE 5 of the scanner 111 of this embodiment. In FIG. 3, compared with the circuit configuration in FIG. 10 as a conventional example, a SHD controller (SHD_CTL) 9 is located on an output route 10 from DRV 6 to AFE 5 to turn on and off a sample hold signal (SHD).

Namely, in FIG. 3, a sample hold signal (SHD) produced from TG 3 enters the SHD controller (SHD_CTL) 9. When the AFE_VCC is not started up (when the AFE is not powered on), the sample hold signal (SHD) is OFF (Low). After the AFE_VCC is started up, the sample hold signal (SHD) is ON (High). The SHD controller (SHD_CTL) 9 is turned on and off with a SHD_EN signal, which can prevent an excess voltage. In FIG. 3, the SHD controller (SHD_CTL) 9 is located between the DRV 6 and the AFE 5, and mat be located between the TG 3 and the DRV 6.

Figure 4:
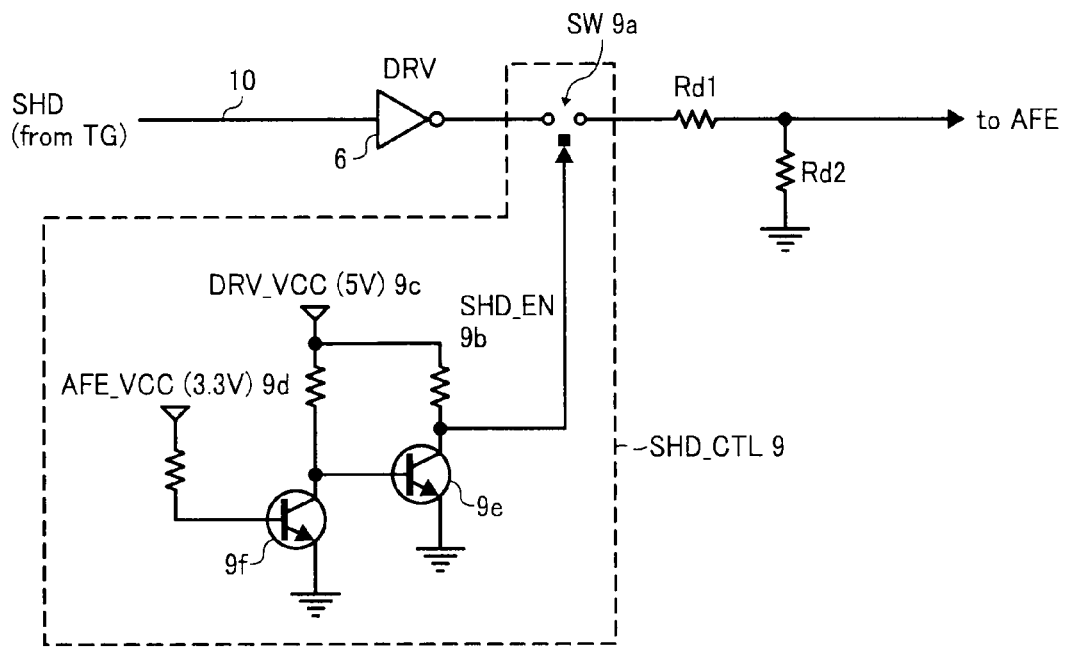
FIG. 4 is a view showing a specific circuit configuration of a SHD control (SHD_CTL) in Embodiment 1.
Figure 5:
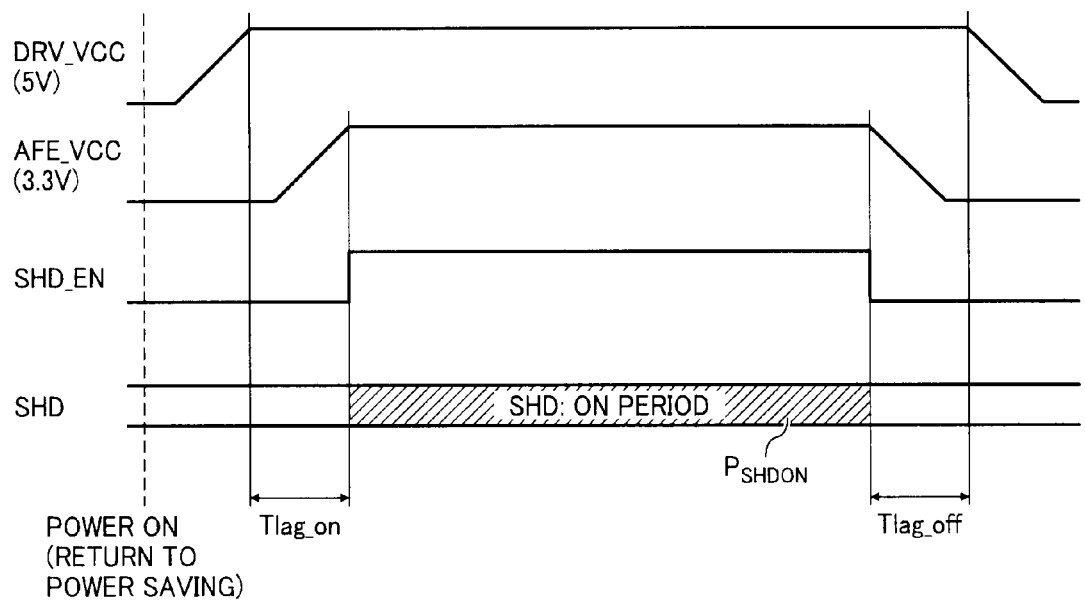
FIG. 5 is a timing chart showing relationships among SHD_EN, AFE_VCC and DRV_VCC while SHD is on in Embodiment 1.
Figure 12:
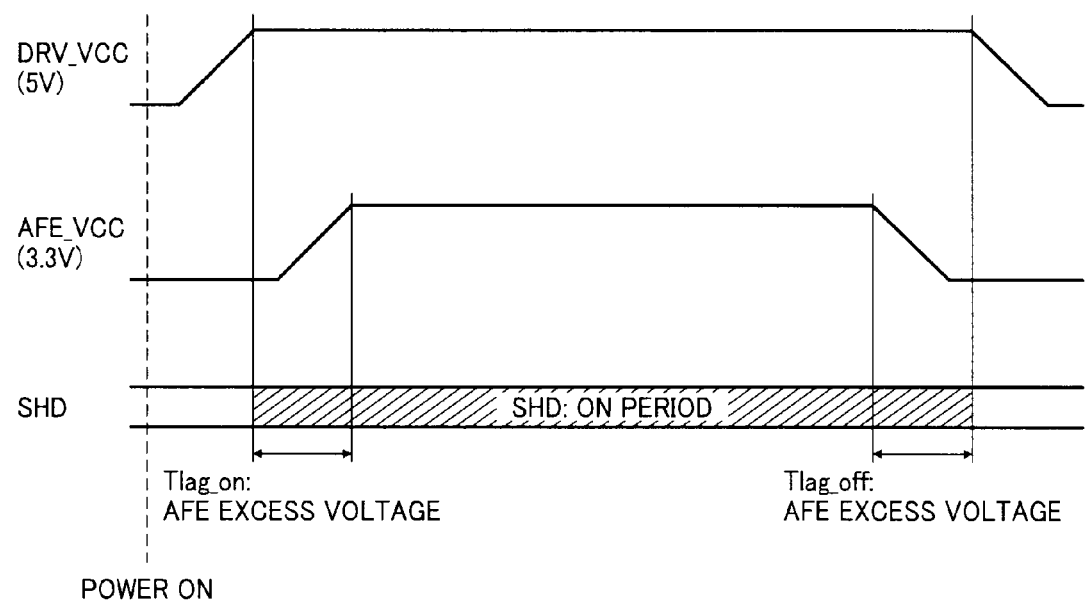
FIG. 12 is a timing chart showing relationships among a sample hold signal of the AFE (SHD), DRV_VCC and AFE_VCC in FIG. 11.

FIG. 4 is a view showing a specific circuit configuration of the SHD control (SHD_CTL) 9. A switch (SW) 9a is located at an output terminal of the DRV 6, which controls the entrance of the SHD signal. A SW control signal SHD_EN 9b is formed of DRV_VCC 9c, AFE_VCC 9d, and two switching transistors 9e and 9f. The DRV_VCC 9c and the AFE_VCC 9d are activated by the switching transistors 9e and 9f can turn the SHD off when the AFE 5 does not rise up and turn the SHD on after the AFE 5 rises up as shown in FIG. 5 even if there is a time lag (Tlag_on and Tlag_off) shown in FIG. 12 between the DRV_VCC 9c and the AFE_VCC 9d. This can prevent an excess voltage to the AFE 5. Namely, as shown from FIG. 5, when the SHD_EN is high, the SHD in an ON period P SHDON, and DRV_VCC 9c and the AFE_VCC 9d both rise up in the period. Not showing in FIG. 4, when controlling timing of turning the SHD on and off, a voltage coming from dividing the DRV_VCC 9c or the AFE_VCC 9d, or a delayed voltage may be applied to the bases of the switching transistors 9e and 9f. In FIG. 4, when the switch (SW) 9a is turned off, the logic of the SHD (Low) depends on a voltage-dividing resistance Rd2.

Thus, since the driver (DRV) 6 of the CCD 4 and an electric source of the AFE 5 control the SHD output, an excess voltage to the AFE 5 can be avoided and the electric source sequence is not limited when the image forming apparatus is driven at high speed. Therefore, image forming apparatuses share the scanner (or the control board).

The sample hold signal (SHD) can surely be turned off until the AFE 5 rises up when the power is on and after the AFE 5 is shut down when the power is off.

Embodiment 2

In FIG. 4, the switch SW 9a is tuned on and off to turn on and off the sample hold signal (SHD). When the switch SW 9a is connected with the CCD driver (DRV) 6 in series, it is difficult to ensure the signal timing due to ON resistance and its unevenness. In this embodiment, instead of externally attaching the switch (SW) 9a, the output control terminal 6 ctl of the CCD driver (DRV) 6 is used. Thus, it is not difficult to ensure timing and the control in FIG. 5 can be realized.

Figure 6:
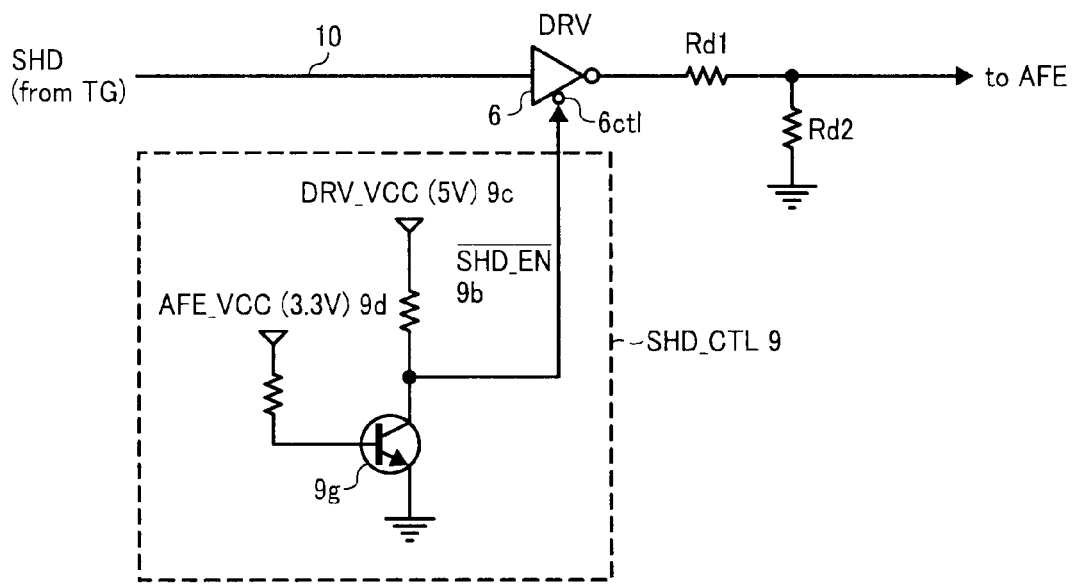
FIG. 6 is a view showing a circuit configuration of a SHD control (SHD_CTL) in Embodiment 2.

FIG. 6 is a view showing a circuit configuration of the SHD controller (SHD_CTL) 9 controlling on and off using the output control terminal 6 ctl of the CCD driver (DRV) 6 in Embodiment 2.

The SHD_EN 9b is generated as it is in FIG. 4 in Embodiment 2. However, the switch SW 9a need not be connected with the DRV output. Since the SHD_EN is Low active (the output control terminal is typically Low active), FIG. 6 can be configured with one switching transistor 9g.

Other unexplained parts are configured and function as those of Embodiment 1.

This embodiment exerts the same effect of Embodiment 1 without the switch SW 9a therein.

Embodiment 3

Figure 11:
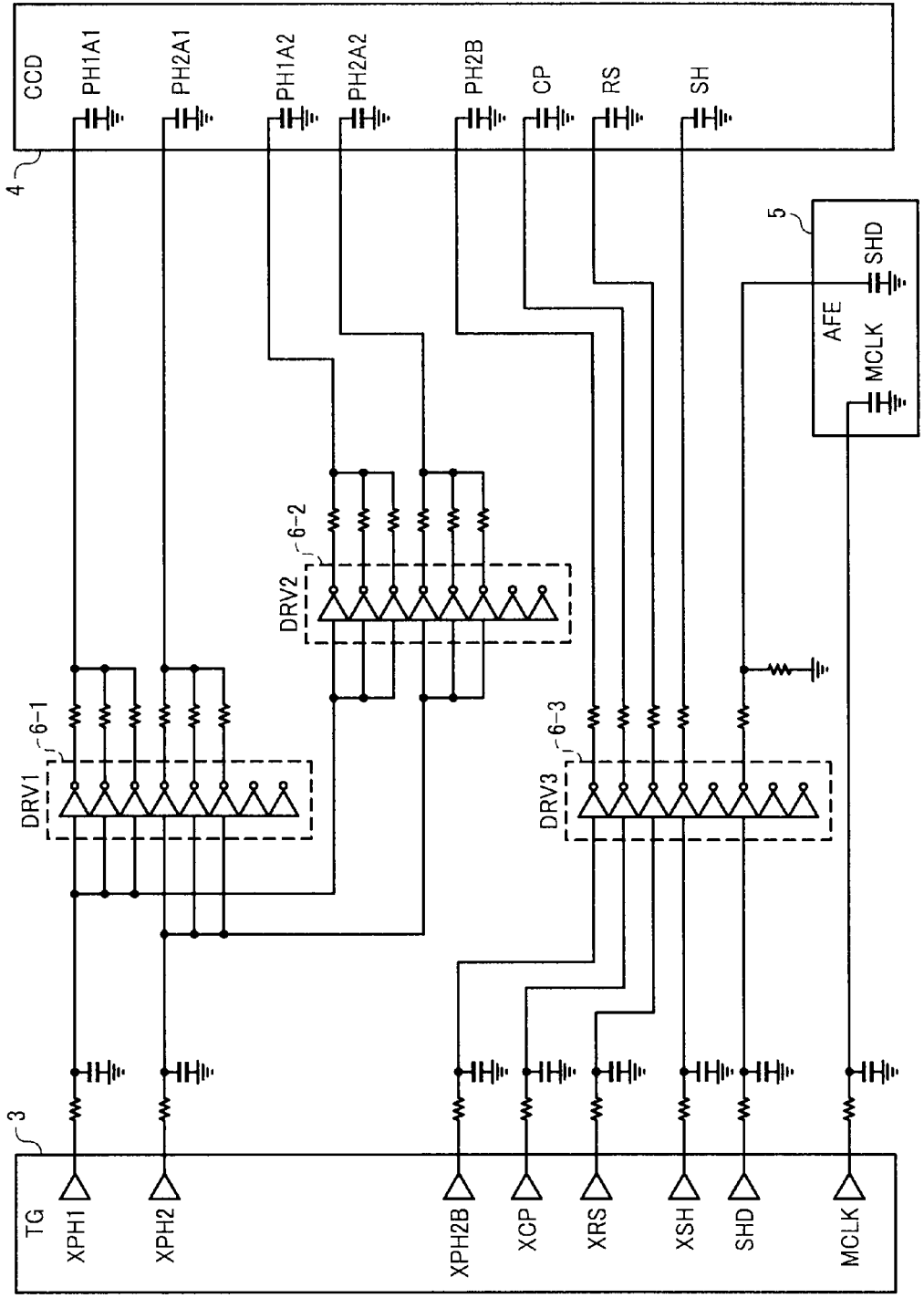
FIG. 11 is a view showing details of a circuit configuration periphery of the timing signal generation part (TG), the CCD and the AFE in FIG. 10.

The signal allocation in the CCD driver (DRV) 6 is an allocation in consideration of driving easiness, e.g., signals, the timing of which is strictly limited are driven by the same drivers (DRV) 6-1, 6-2 and 6-3 as a conventional embodiment in FIG. 11. As shown from FIG. 11, an extra gate is often present in each of allocated drivers (DRV) 6-1, 2 and 3. In consideration of necessity of generating the SHD_EN signal 9b with the DRV_VCC 9c (5V), the SHD can be controlled with a simple constitution without an additional component if a reverse signal 9b' to the SHD_EN is generated with the same driver (gate) of the SHD signal.

Figure 7:
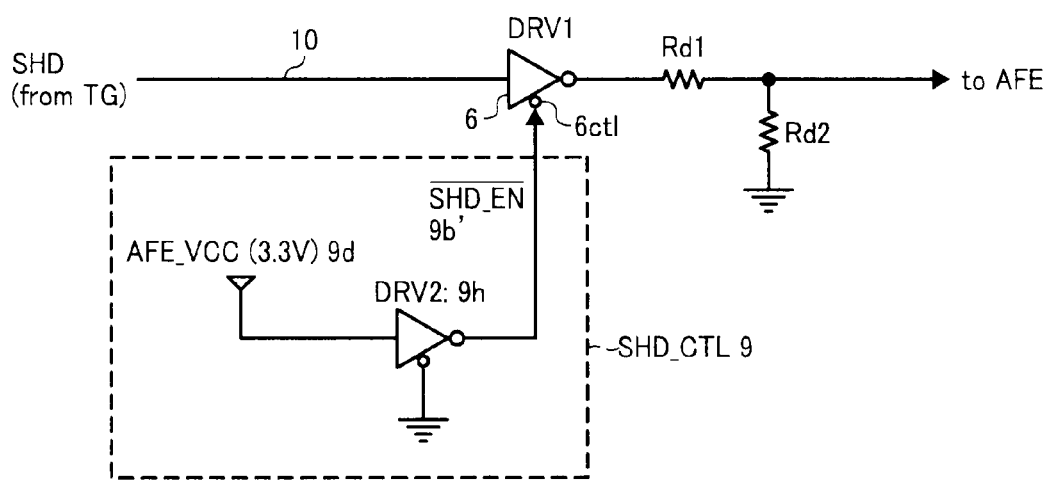
FIG. 7 is a view showing a circuit configuration of a SHD control (SHD_CTL) in Embodiment 3.

FIG. 7 is a view showing a circuit configuration of the SHD control (SHD_CTL) 9 in Embodiment 3. In FIG. 7, a CCD driver (DRV1) 6 drives the SHD, an output control driver (DRV2) 9h generates the reverse signal 9b' to the SHD_EN. When the AFE_VCC 9d enters the output control driver (DRV2) 9h, the output of the output control driver (DRV2) 9h is high and that of the CCD driver (DRV1) 6-1 is Hi-z if the AFE 5 does not rise up and the DRV_VCC 9c rises up. When the AFE_VCC 9d rises up, the output control driver (DRV2) 9h is Low and the output of the CCD driver (DRV1) 6-1 is effective.

Thus, the sample hold signal (SHD) is controlled to prevent the SHD from entering when the AFE 5 does not rise up.

Other unexplained parts are configured and function as those of Embodiment 1.

This embodiment generates a reverse signal 9b' to the SHD_EN with the same driver (gate) of the SHD signal to exert the same effects of Embodiments 1 and 2 without an additional component.

Embodiment 4

Figure 8:
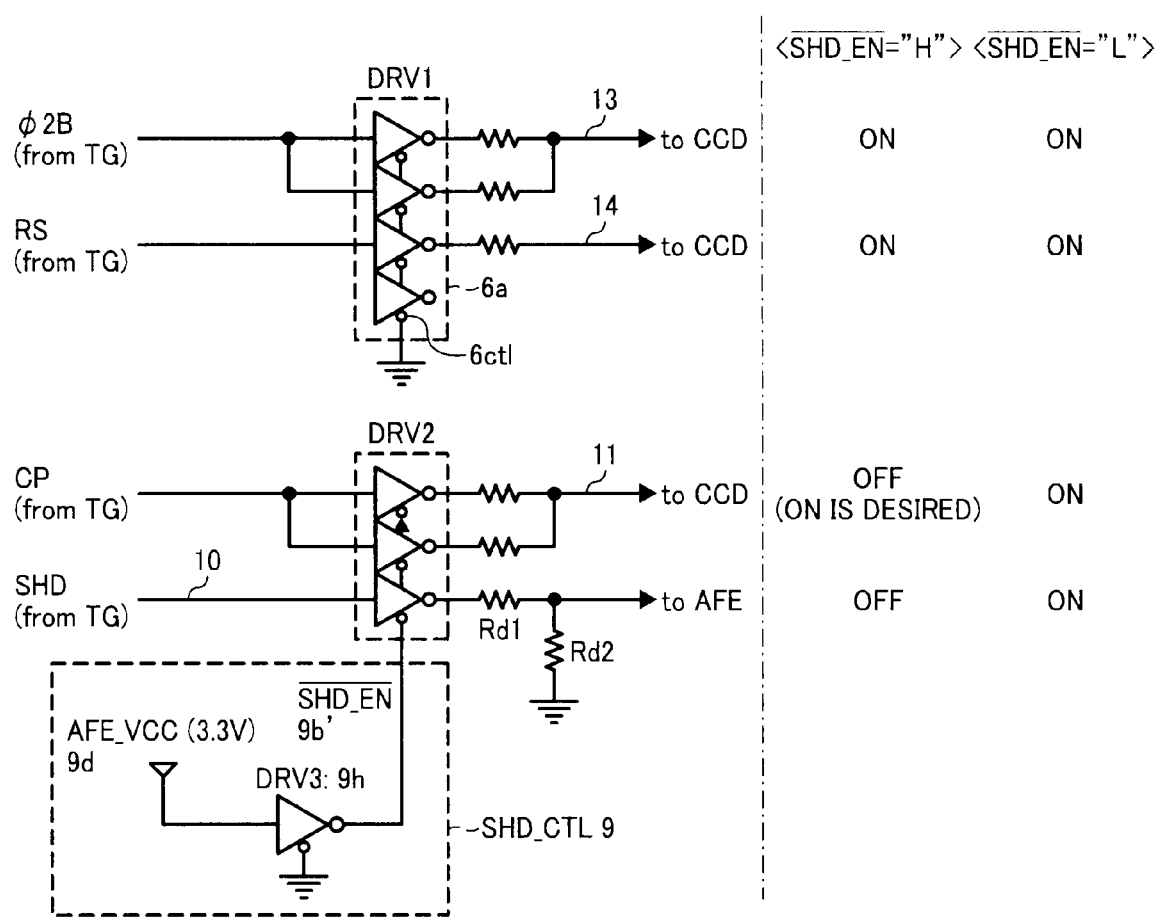
FIG. 8 is a view showing a configuration of a control circuit controlling lighting of a CCD with parallely-connected plural drivers (gates) in a conventional embodiment.

In embodiment 3, the AFE_VCC 9d enters the output control driver (DRV2) 9h so as to turn on the sample hold signal (SHD) when the DRV_VCC (5V) and the AFE_VCC (3.3V) are High as shown in FIG. 5. When the CCD 4 or AFE 5 is driven at high speed, plural drivers (gates) are occasionally parallel-connected for the purpose of preventing unevenness of the output resistance of the CCD driver (DRV) 6 (FIG. 8). Then, since the CCD driver (DRV) 6 typically controls plural gate outputs with one output control terminal 6 ctl, as shown in FIG. 8 (output circuit 10 shown by SHD-from Tg to AFE), even other signals which are not required to control are turned on and off when the output control terminal 6 ctl controls the sample hold signal (SHD) (output circuit 11 shown by CP from TG to CCD).

The CCD 4 lighted and driven by output circuits 13 and 14 is turned on (lighted) when the drive signal is turned on even when the reverse signal 9b' to the SHD_EN is High or Low because the reverse signal 9b' to the SHD_EN does not enter the output control terminal 6 ctl. Meanwhile, a CCD lighted and driven by an output circuit 11 should be turned on and lighted, but is turned off and not lighted when the High reverse signal 9b' to the SHD_EN enters the output control terminal 6 ctl from the SHD controller (SHD_CTL) 9.

Figure 9:
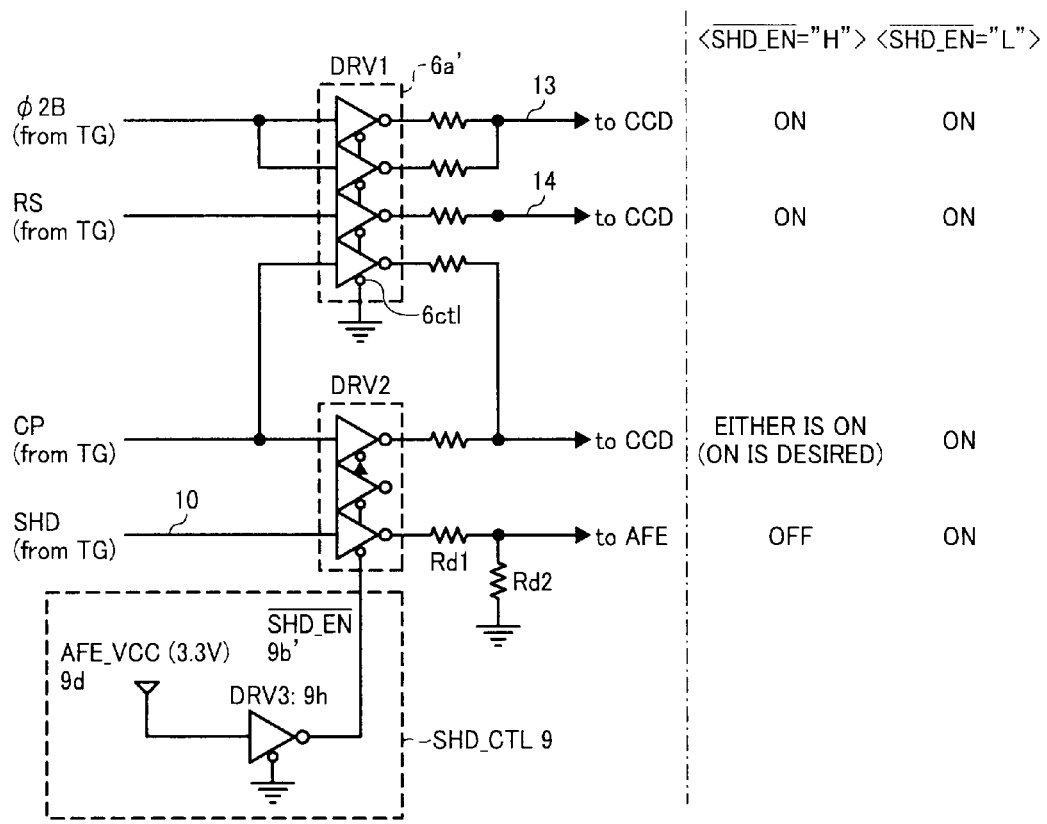
FIG. 9 is a view showing a configuration of a control circuit controlling lighting of a CCD with parallely-connected plural drivers (gates) in Embodiment 4.

In this embodiment, as shown in FIG. 8, when the output of the CCD driver (DRV2) 6b is plurally and parallely driven, the circuit includes at least one gate the output of which is not controlled by the SHD control as shown in FIG. 9. Namely, in FIG. 9, a gate of the output circuit 11 (CP from TG to CCD) is parallely connected with an extra gate of a CCD driver (DRV1) 6a.

Thus, even when the High reverse signal 9b' to the SHD_EN enters the output control terminal 6 ctl of the CCD driver (DRV2) 6b from the SHD controller (SHD_CTL) 9, the CCD is not turned off but on and lighted based on an output from a gate of the CCD driver (DRV!) 6a. As shown in FIG. 8, a case where control signal from the SHD controller 9 turns off other signals together and a drive signal which does not enter the CCD is present can be avoided.

When the drive status of the CCD is not specified, e.g., the CP does not enter and other signals enter, the output thereof is unstable and possibly produces an excess voltage. Therefore, the lighting of the CCD needs to be controlled after the drive status thereof is specified.

Other unexplained parts are configured and function as those of Embodiments 1 and 3.

This embodiment prevents the other signals from being unfed to the CCD 4 and to stabilize the output of the CCD when the sample hold signal (SHD) is turned on and off.

Embodiment 5

Embodiments 1 to 4 refer to an excess voltage when power is on and off. Many of the latest scanners and copiers have a low-power mode (energy-saving mode). For them, transit and return to the low-power mode are much more frequently made than powering on and off, and same problems of excess voltage occur and its frequency makes the problems more serious.

In this embodiment, the sequences when power is on and off explained in embodiments 1 to 4 are replaced with a sequence of the transit and return to the energy-saving mode.

Namely, High inputs of the DRV_VCC 9c and AFE_VCC 9d of the SHD controller 9 in embodiments 1 and 2 and that of the AFE_VCC in embodiments 3 and 4 are equivalent to drive power on of return to the energy-saving mode. Low inputs thereof are equivalent to drive power on of transit thereto.

Therefore, an effect of preventing the excess voltage when the transit and return to the energy-saving mode (low-power mode) can noticeably be improved because the number thereof is larger than that of the power on and off.

The present invention is not limited to these embodiments and includes all technical matters contained in technical ideas described in claims.

This application claims priority and contains subject matter related to Japanese Patent Application No. 2009-001744 filed on Jan. 7, 2009, the entire contents of which are hereby incorporated by reference.

Having now fully described the invention, it will be apparent to one of ordinary skill in the art that many changes and modifications can be made thereto without departing from the spirit and scope of the invention as set forth therein.

What is claimed as new and desired to be secured by Letters Patent of the United States is:

1. A scanner, comprising:
a photoelectric conversion element configured to photoelectrically convert light reflected from an original image to form an image signal;
a timing generation circuit configured to generate a drive signal for the photoelectric conversion element;
a drive circuit configured to drive the photoelectric conversion element;
a signal processing circuit configured to subject a sample hold signal fed in through the drive circuit and the image signal to an A/D conversion; and
a control circuit configured to turn on the sample hold signal when the scanner transitions to an "ON" state from an "OFF" state and turn off the sample hold signal when the scanner transitions to the "OFF" state from the "ON" state,
wherein the control circuit turns on and off the sample hold signal, based on each of input fed to the drive circuit and the signal processing circuit.

2. The scanner of claim 1, wherein the control circuit is connected in a position that is adjacent to the drive circuit.

3. The scanner of claim 1, wherein the control circuit turns on and off the sample hold signal with an output control terminal of the drive circuit.

4. The scanner of claim 1, wherein the control circuit turns on the sample hold signal when the scanner transitions to the "ON" state, which is a full power state, from a low-power mode and turns off the sample hold signal when the scanner transitions to the low-power mode from the "ON" state.

5. An image forming apparatus, comprising:
the scanner according to claim 1; and
a printer comprising a printer engine.

6. A scanner, comprising:
a photoelectric conversion element configured to photoelectrically convert light reflected from an original image to form an image signal;
a timing generation circuit configured to generate a drive signal for the photoelectric conversion element;
a drive circuit configured to drive the photoelectric conversion element;
a signal processing circuit configured to subject a sample hold signal fed in through the drive circuit and the image signal to an A/D conversion; and
a control circuit configured to turn on the sample hold signal when the scanner transitions to an "ON" state from an "OFF" state and turn off the sample hold signal when the scanner transitions to the "OFF" state from the "ON" state,
wherein a control signal controlling on and off of the sample hold signal is transmitted to an output control terminal of the drive circuit and is based on the power of the signal processing circuit.

7. The scanner of claim 6, wherein a random drive signal of the photoelectric conversion element is a signal from two or more parallel-connected drive gates, the signal being based on a third signal controlled by on and off of the sample hold signal and a fourth signal not controlled thereby.

8. A method of controlling a sample hold signal in a scanner, comprising:
photoelectrically converting light reflected from an original image with a photoelectric conversion element to form an image signal;
generating a drive signal for the photoelectric conversion element with a timing generation circuit;
driving the photoelectric conversion element with a drive circuit;
subjecting a sample hold signal fed in through the drive circuit and the image signal to an A/D conversion by a signal processing circuit; and
turning on the sample hold signal when the scanner transitions to an "ON" state from an "OFF" state and turning off the sample hold signal when the scanner transitions to the "OFF" state from the "ON" state, based on power supplied to each of the drive circuit and signal processing circuit.

9. The method of claim 8, further comprising turning on the sample hold signal when the scanner transitions to the "ON" state, which is a full power state, from a low-power mode and turning off the sample hold signal when the scanner transitions to the low-power mode from the "ON" state.

10. A method of controlling a sample hold signal in a scanner, comprising:
photoelectrically converting light reflected from an original image with a photoelectric conversion element to form an image signal;
generating a drive signal for the photoelectric conversion element with a timing generation circuit;
driving the photoelectric conversion element with a drive circuit;
subjecting a sample hold signal fed in through the drive circuit and the image signal to an A/D conversion by a signal processing circuit,
wherein a control signal controlling on and off of the sample hold signal is transmitted to an output control terminal of the drive circuit and is based on the power of the signal processing circuit, and
wherein turning on and off the sample hold signal when the scanner is powered on, respectively, is based on power supplied to each of the drive circuit and signal processing circuit.

* * * * *